E. V. FRENCH.
WATER METER.
APPLICATION FILED APR. 28, 1908.
1,020,037.
Patented Mar. 12, 1912.
4 SHEETS—SHEET 2.
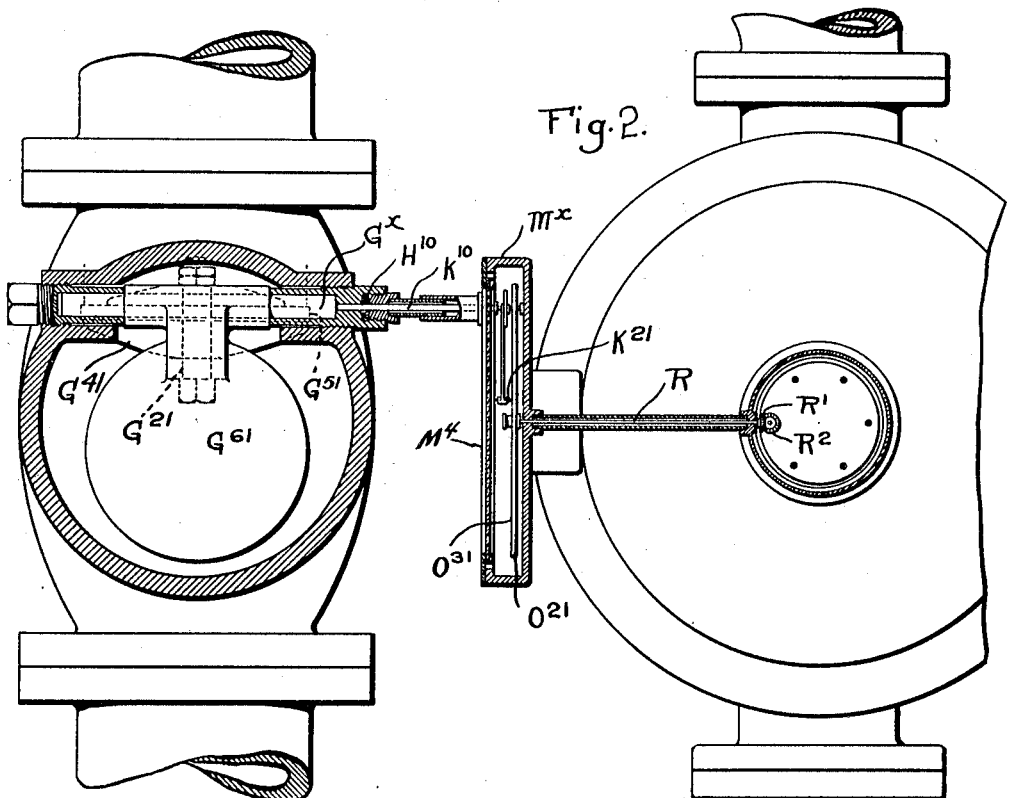
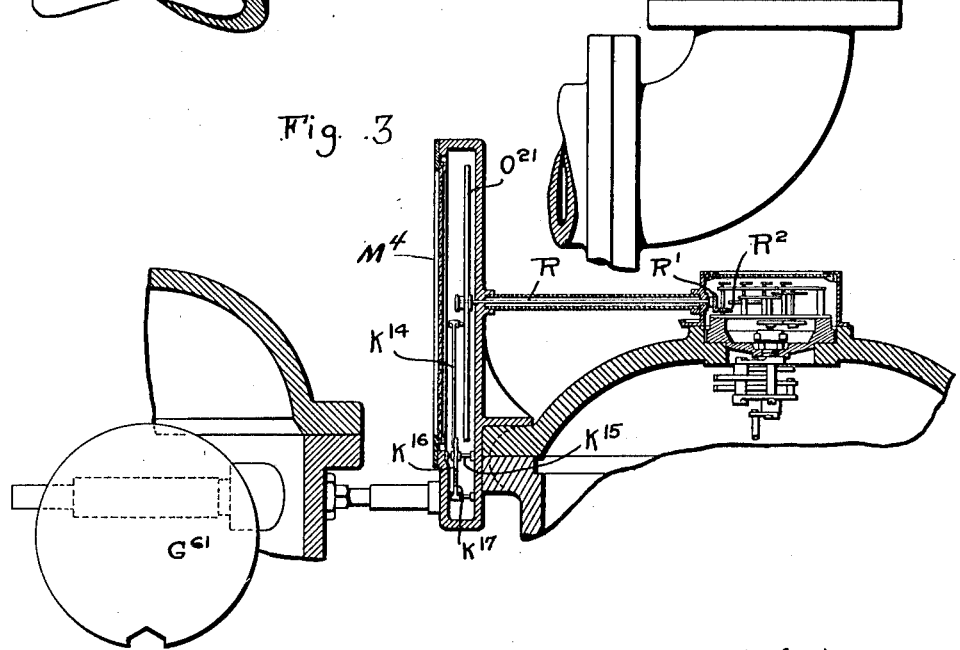
Witnesses.
W. C. Lunsford
Joseph M. Ward
Inventor.
Edward V. French,
by Crosby & Gregory Atty's E. V. FRENCH.
WATER METER.
APPLICATION FILED APR. 28, 1908.
1,020,037.
Patented Mar. 12, 1912.
4 SHEETS—SHEET 3.
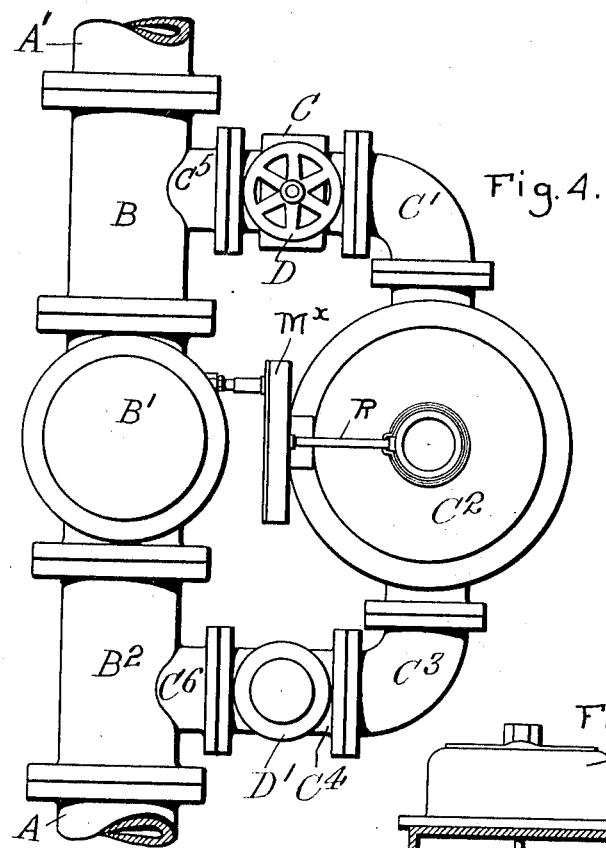
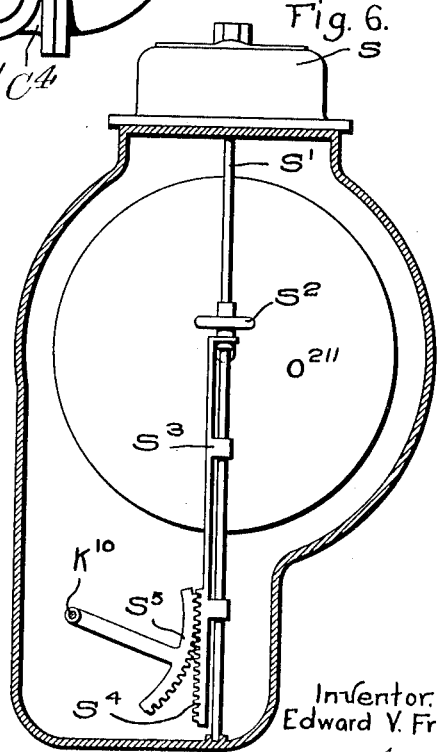

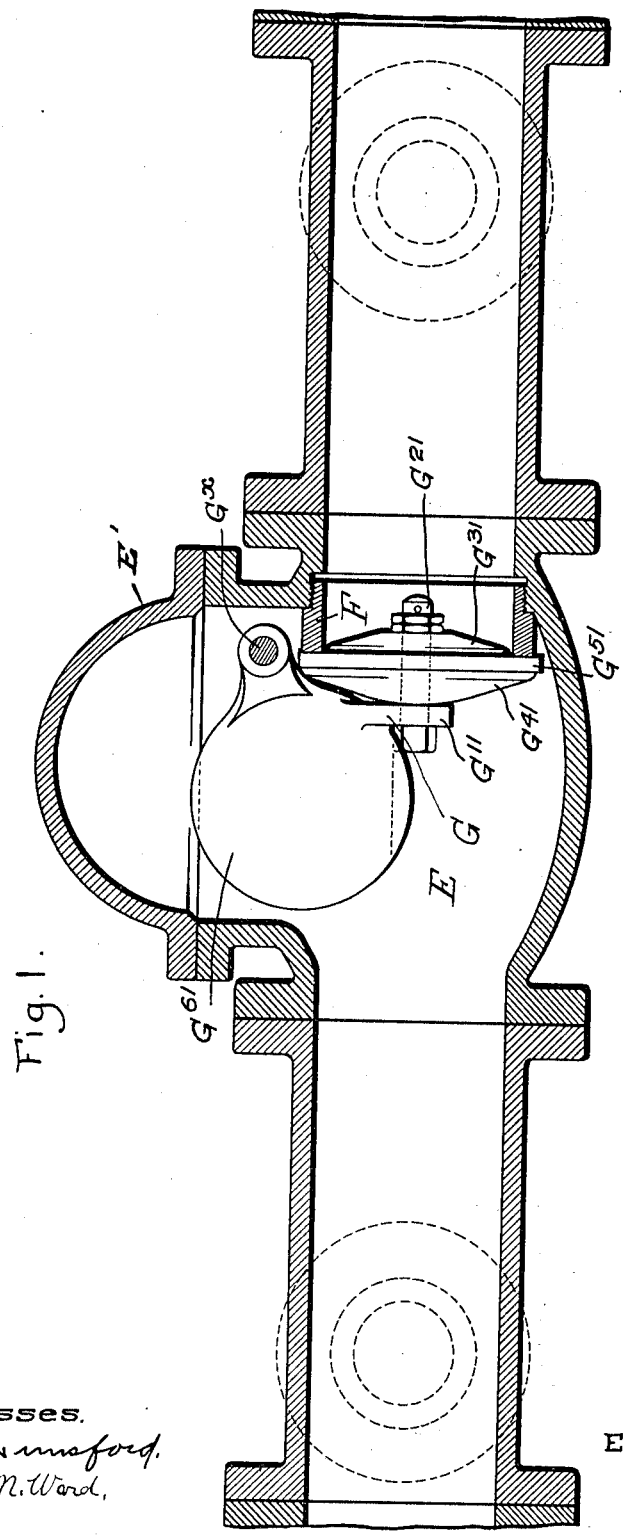

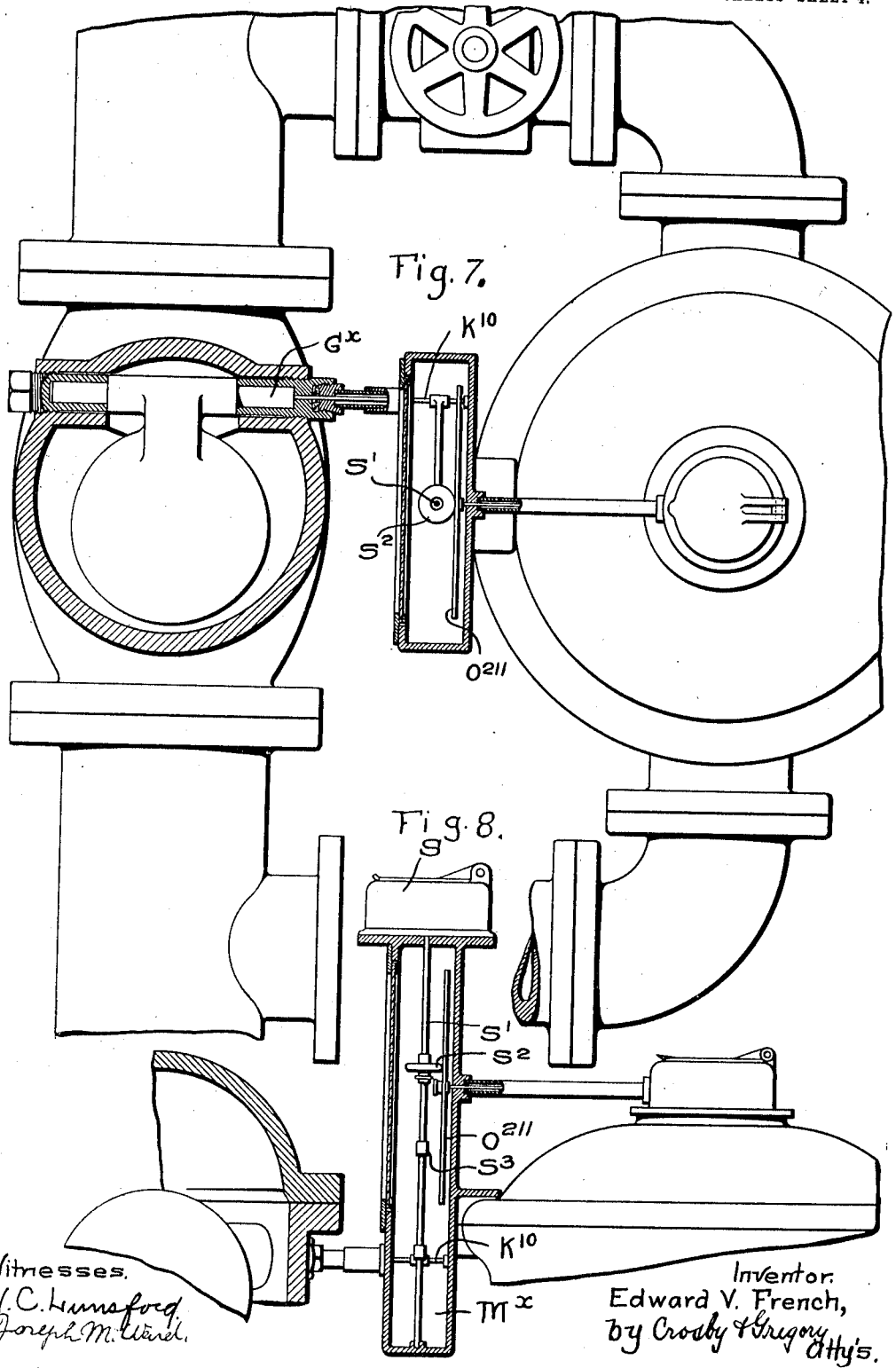

UNITED STATES PATENT OFFICE.

EDWARD V. FRENCH, OF LYNN, MASSACHUSETTS.

WATER-METER.

1,020,037.  Specification of Letters Patent.  Patented Mar. 12, 1912.

Application filed April 28, 1908.  Serial No. 429,649.

*To all whom it may concern:*

Be it known that I, EDWARD V. FRENCH, a citizen of the United States, and a resident of Lynn, in the county of Essex and State of Massachusetts, have invented an Improvement in Water-Meters, of which the following description, in connection with the accompanying drawing, is a specification, like letters on the drawing representing like parts.

This invention relates to that class of meters designed to measure accurately the passage of small quantities of water through a main, and also when called upon to measure approximately the passage of large flows, but without affording obstruction to the flow such as would occur from the location of mechanism within the main itself.

Such a device as that involved in the present invention has its principal use in connection with a main on which dependence is had for furnishing water in the case of fire. In such case, under ordinary circumstances, the flow through the main is comparatively small, but it is desirable to measure the flow either for commercial purposes or to prevent surreptitious use of the water in small quantities. For the purpose of measuring such small flows a by-pass is provided and means such as an ordinary meter placed therein for registering or recording accurately the amount of water passing through the by-pass, a weighted check-valve acting meanwhile to keep the main closed and divert all the water through the by-pass. It is desirable, however, to measure also larger flows through the main than can be accommodated by the by-pass, but as such flows are not expected to occur regularly it is sufficient if they be measured approximately. Since, however, in the case of fire the water must pass through the main in the maximum amount, it is absolutely necessary to have the flow as full and free as possible, and hence any measuring appliance which obstructs or retards the passage of the flow or is liable to do so by getting out of order must be avoided.

The present invention provides for the approximate measurement of a large flow of water through the main by providing the passageway with a check-valve and making use of the principle deduced from a number of experiments that the check valve always assumes a definite position for each flow of water, regardless of the pressure. Hence the invention provides means for indicating and recording the extent of opening of the check-valve, whereby the amount of flow at any given time can be ascertained, and also means for indicating and recording the lapse of time, whereby the amount of water flowing during a given period can be ascertained. The check-valve is rarely wide open except in the case of fire when no charge is usually made for the amount of water consumed, and no measurement need be recorded. In this invention the check-valve is so arranged as to have a substantially constant moment for all openings, thus securing a constant friction loss and the maintenance of a constant flow through the by-pass, as a result of which the by-pass meter itself is used as the operating mechanism of the indicating and recording means.

The invention will appear more fully from the accompanying description and drawings, and will be particularly pointed out in the appended claim.

The drawings represent a water meter embodying the invention as designed for a fire supply service.

Figure 1 is a vertical, longitudinal cross-section of the meter in which the indicating and recording mechanism is operated from the by-pass meter, and in which the record is traced on a disk. Fig. 2 is a top plan view, partially in cross-section, of a portion of the meter shown in Fig. 1. Fig. 3 is a longitudinal central vertical cross-section of a portion of the said meter to show the arrangement of the recording mechanism. Fig. 4 is a top plan view of the said meter in position in the main. Fig. 5 is a detail view to show the disk or chart on which the record is traced. Fig. 6 is a detail view of another form of recording apparatus wherein the amount of flow is indicated on dials. Fig. 7 is a top plan view partially in horizontal cross-section of the latter form of meter. Fig. 8 is a side elevation partially in longitudinal vertical cross-section of the latter form of meter.

The meter is designed to be bolted in place in the usual way between the sections A, A' of an ordinary water main. The meter itself comprises a large passageway designed to allow the passage of the maximum flow of water capable of passing through the main A, A', and a small passageway designed to allow the passage of small flows of water, such as occur under usual or regular conditions.

The large passageway is herein shown as formed in three sections B, B', B², which are bolted together by means of the abutting flanged ends in the usual manner. The small passageway, as herein shown, is formed in five sections, C, C', C², C³, C⁴, and the branches C⁵, C⁶ of the large sections B, B², all bolted together by means of the abutting flanged ends in the usual manner.

The central section B', herein shown as containing the large passageway, contains the check-valve by means of which the large passageway is opened and closed. It will thus be seen that when the check-valve is closed the flow through the main will take place around through the small passageway, and that when the check-valve is open the flow through the main will take place through both passageways.

The central section C² of the small passageway is provided with a device for accurately measuring the flow of water therethrough, and this device may be of any good commercial type of meter, its size to be dependent upon the amount of water passing through the main under ordinary circumstances. It is unnecessary to describe the mechanism of this device for it is not involved in the present invention, and any suitable device may be used.

The section C at the intake end of the small passageway is provided with a gate valve, the operating handle D of which is shown, so that the measuring device in the small passageway may be disengaged for repairs or removal without shutting water from the entire system. The section C⁴ at the exit end of the small passageway is provided with a check-valve indicated at D', which prevents any backward flow of water through the small passageway, such as might take place when a pump is connected to, and in operation at the inner end of the main.

The central section B' of the main passageway is enlarged to form a chamber E of sufficient size to allow for the mounting and operation of the check-valve, and the upper portion or cover E' is herein shown as removable in order to allow of access thereto. At the admission end of the chamber E is located the check-valve seat F, and the check-valve is pivotally mounted at G$^x$ in the upper part of the chamber E so as to swing by gravity into closing position against the seat F.

The check-valve is shown as comprising an arm G'', a spindle or bolt G$^{21}$ passing through the end of the arm, and having mounted thereon two metal disks G$^{31}$, G$^{41}$ between which is clamped a disk of rubber G$^{51}$, the disk G$^{31}$ being smaller than the disk G$^{41}$ so that the rubber alone contacts with the valve-seat to make a tight joint. The check-valve is also weighted, as indicated at G$^{61}$, the amount of said weight depending upon the flow at which it is desired the check-valve shall open. This weight is so placed with respect to the pivot that the moment decreases as the check-valve opens, and thus the friction loss through the whole device decreases from the time the check-valve opens until it reaches its wide open position, when it gradually increases with the flow.

It has been ascertained that in the case of a check-valve, such for example as that illustrated, wherein the position of the check-valve is controlled while open by the flow through the passageway, that the check-valve always assumes a definite position for each flow of water regardless of the pressure. If, therefore, the position of the check-valve be ascertained from time to time, the amount of water passing can be calculated to a very close approximation. Various means may be arranged for securing the indication and recording of the check-valve positions during given periods of time, and several forms of such means are herein illustrated. In the construction herein illustrated the pivotal shaft to which the check-valve is attached is reduced to a small diameter at one end beyond the bearing, as indicated at K$^{10}$, and extended through a stuffing-box H$^{10}$ in the meter wall, into a water-tight case M$^x$, fastened to the meter wall. The case M$^x$ is arranged so that the shaft G$^x$ may extend directly into the case and so that driving connections may extend from the case to the by-pass meter. Within this case M$^x$ is mounted mechanism for indicating and recording the position of the check-valve, in the form shown in Figs. 2 to 5 inclusive. The shaft X$^{10}$ carries at its end within the casing M$^x$ a toothed segment K$^{17}$ engaging a gear toothed arm K$^{16}$ on a lever K$^{14}$, fulcrumed at K$^{15}$. This lever K$^{14}$ carries at its free end a suitable marker K$^{21}$ which traces a line on a chart O$^{31}$, suitably divided by suitable ordinates and abscissas. This chart is mounted on a disk O$^{21}$ driven by any suitable means, as by gears R' R² and shaft R connected with a movable part of the mechanism of the by-pass meter. Since the disk O$^{21}$ with the chart thereon is driven at a uniform speed, the beveled gears R' R² or other connecting parts may be so proportioned, as the result of calibration, as to cause the disk O$^{21}$ and the chart thereon to make a rotation in some fixed period of time, so that the abscissas on the chart will indicate periods of time, and the ordinates the position of the check-valve. But since the position of the check-valve has a definite relation to the amount of water passing, by a simple calibration of the meter the ordinates on the chart may be expressed in terms of flow as "gallons per minute." Thus it will be seen that when the check-valve is open the line traced upon the chart will indicate and record the amount of water flowing through the large passageway. The rate of flow will thus be indicated by the position of the check-valve or by the ordinate on such a chart as described and can be readily ascertained at any desired time. The amount of water flowing through the large passageway can thus be quite closely computed by taking the average gallons per minute for periods of time during which the flow was fairly constant and multiplying these by the time. Then add all such results together. If the amounts were changing rapidly it would simply be necessary to take short periods of time and strike average flows. In this way results close enough for all practical purposes can be obtained readily. The meter, as already pointed out, is not intended for regular ordinary flows where accurate measurement is desired and obtainable, but for the more or less irregular flows which go beyond the capacity of the by-pass. Extreme flows occurring at high rates, as in the case of fire, it is seldom necessary to measure and this is not provided for by this device. The total flow through the main will, of course, be the amount recorded by the small measuring device in the small passageway plus the amount computed as passing through the large passageway.

The shaft $K^{10}$ is made small not only to reduce friction in the stuffing-box but also so that it will readily twist off instead of blocking the check-valve if it should become bent or stuck in the stuffing-box, or injured, because it is essential especially in fire service, that there shall be nothing to obstruct the movement of the check-valve.

The recording case should be kept water-tight and since access must be had for the renewing of the charts the case may be provided with a cover $M^4$, locked in place in any suitable manner.

The particular means for recording the flow may, of course, be modified to suit special conditions.

It will be observed that if the friction loss through the main is arranged to be substantially constant and the increase in the clapper openings substantially uniform for successive quantities, that the flow through the by-pass and consequently the movement of the meter therein will be substantially constant. These results are secured by so weighting and arranging the clapper that the moment of all these parts shall be substantially constant for all clapper openings.

A uniform speed of the disk and the chart carried thereby, and the arrangement of the parts so that there shall be equal amounts of increase in the opening of the check-valve for equal increase in quantity of flow while desirable and contemplated by this invention, are not essential, because by proper calibration the same ultimate result can be obtained.

In some cases it may be desired to provide a device which may be read directly, and for that purpose a construction such as shown in Figs. 6–8 of the drawings may be arranged, where the parts are as already described, except in the following particulars. The casing $M^x$ is provided at its upper end with reading dials, the casing of which is indicated at S, as in the case of an ordinary direct reading meter and a vertical shaft $S'$ extends through the casing and serves to operate the reading dials in usual manner. A flat friction disk $O^{211}$ is mounted and driven in the same manner as the disk $O^{21}$ already described. A small friction wheel $S^2$ is splined on the shaft $S'$ and carried in the vertically movable frame $S^3$, sliding on the shaft $S'$ and provided at its lower end with a toothed rack $S^4$. The extension $K^{10}$ of the shaft $G^x$ carries a toothed segment $S^5$, engaging the toothed rack $S^4$. It will thus be seen that the movement of the check-valve serves to position the friction wheel $S^2$ at varying distances from the center of the friction disk $O^{211}$, thus driving the friction wheel $S^2$ and consequently the shaft $S'$ and the dials of the reading meter at a proportionate speed. By this means the dials in the reading meter will give a direct indication of the amount of water passing through the main passageway.

Having described my invention what I claim as new and desire to secure by Letters Patent, is:

A water meter comprising a main passageway, a check-valve pivotally mounted in said passageway, the weight of the check-valve and connected parts being distributed with respect to the pivotal axis of the check-valve as to secure a substantially constant moment during the movement of the check-valve, a by-pass around said check-valve, metering mechanism located in said by-pass for measuring the amount of flow therethrough, means driven by said metering mechanism for indicating the lapse of time, and means operated by the check-valve for indicating and recording thereon the positions of the check-valve while open.

In testimony whereof, I have signed my name to this specification in the presence of two subscribing witnesses.

EDWARD V. FRENCH.

Witnesses:
FREDERICK S. GREENLEAF,
MABEL PARTELOW.

It is hereby certified that in Letters Patent No. 1,020,037, granted March 12, 1912, upon the application of Edward V. French, of Lynn, Massachusetts, for an improvement in "Water-Meters," errors appear in the printed specification requiring correction as follows: Page 2, line 107, for the reference-numeral "$X^{10}$" read $K^{10}$; page 3, line 108, after the word "being" insert the word *so;* and that the said Letters Patent should be read with these corrections therein that the same may conform to the record of the case in the Patent Office.

Signed and sealed this 16th day of April, A. D., 1912.

[SEAL.] C. C. BILLINGS,
*Acting Commissioner of Patents.*